United States Patent [19]
Yanagawa

[11] 3,912,996
[45] Oct. 14, 1975

[54] SEEKING SWITCH POSITION CONTROL DEVICE FOR A MOVABLE MEMBER
[75] Inventor: Nobuyuki Yanagawa, Tokyo, Japan
[73] Assignee: Ricoh Co., Ltd., Tokyo, Japan
[22] Filed: Apr. 19, 1973
[21] Appl. No.: 352,687

[30] Foreign Application Priority Data
Apr. 20, 1972  Japan.............................. 47-40102

[52] U.S. Cl.................................. 318/673; 318/467
[51] Int. Cl.² ........................................ G05B 11/14
[58] Field of Search ............ 318/602, 467, 673, 674

[56] References Cited
UNITED STATES PATENTS

| | | | |
|---|---|---|---|
| 2,800,618 | 7/1957 | Giacoletto et al. | 318/674 X |
| 3,017,557 | 1/1962 | Amoto | 318/602 |
| 3,256,473 | 6/1966 | Simopoulos et al. | 318/467 X |
| 3,648,139 | 3/1972 | Friedman | 318/467 X |

Primary Examiner—T. E. Lynch
Attorney, Agent, or Firm—Cooper, Dunham, Clark, Griffin & Moran

[57] ABSTRACT

A device for moving into a selected position a movable member capable of moving into a plurality of positions.

1 Claim, 19 Drawing Figures

SEEKING SWITCH POSITION CONTROL DEVICE FOR A MOVABLE MEMBER

BACKGROUND OF THE INVENTION

This invention relates to a position control device for a movable member which is adapted for use with a microfilm locating device or a movable optical system control device and which permits the movable member to be moved from a position in which it is disposed to a selected one of a plurality of predetermined positions.

In one type of position control devices known in the art, a bridge circuit is used which comprises resistors corresponding to a predetermined plurality of positions to which a microfilm or other movable member is moved and adapted to be selected by means of a keyboard and a slide resistor coupled to the movable member, and instructions are given to a direct current motor to rotate in the normal direction, in the reverse direction or stop rotating according to the difference in value between the sliding resistor and the resistor selected by the keyboard, whereby the movable member can be moved to a position selected by the keyboard.

This type of movement control device has the disadvantage of being unable to make the movable member stop positively in a position selected by the keyboard at all times. That is, when the movable member is moved to a selected position, the position in which the movable member stops when it is moved in the normal direction from a position in which it is disposed may vary from the position in which it stops when it is moved in the reverse direction from the position in which it is disposed and which differs from the aforementioned position. This difference in the position in which the movable member stops stems from the fact that the movable member is moved according to the difference in value between the sliding resistor and the resistor selected by the keyboard.

In order to obviate this disadvantage, a direct current motor of good response and resistors of high efficiency should be used so that the movable member can be made to stop positively in the selected position. This increases production cost.

In another type of position control devices known in the art, a code mark attached to a movable member is detected and counted by a counter to determine the position in which the movable member is disposed, and a position selected by the keyboard is decoded by a decoder and compared with the content of the counter by means of a comparator circuit, so that the motor can be controlled by the output of the comparator circuit and the movable member can be moved to the selected position.

Such device also has disadvantages. The use of the comparator circuit to compare one digital signal with another and the counter increases production cost. Besides, the construction of the device is complex and the operation is troublesome.

SUMMARY OF THE INVENTION

This invention obviates the aforementioned disadvantages of the prior art. The invention has as its object the provision of a position control device for a movable member, simple in construction and low in cost, wherein digital selection means is actuated to detect the direction in which the movable member moves from a position in which it is actually disposed to a position which has been selected, the position in which the movable member is disposed is detected by digital current position detection means, and the movable member is moved to the selected position according to the difference between the output of the digital actual position detection means and the output of the digital selection means, whereby the position of the movable member can be positively controlled.

DESCRIPTION OF PREFERRED EMBODIMENTS OF THE INVENTION

Figure 1:
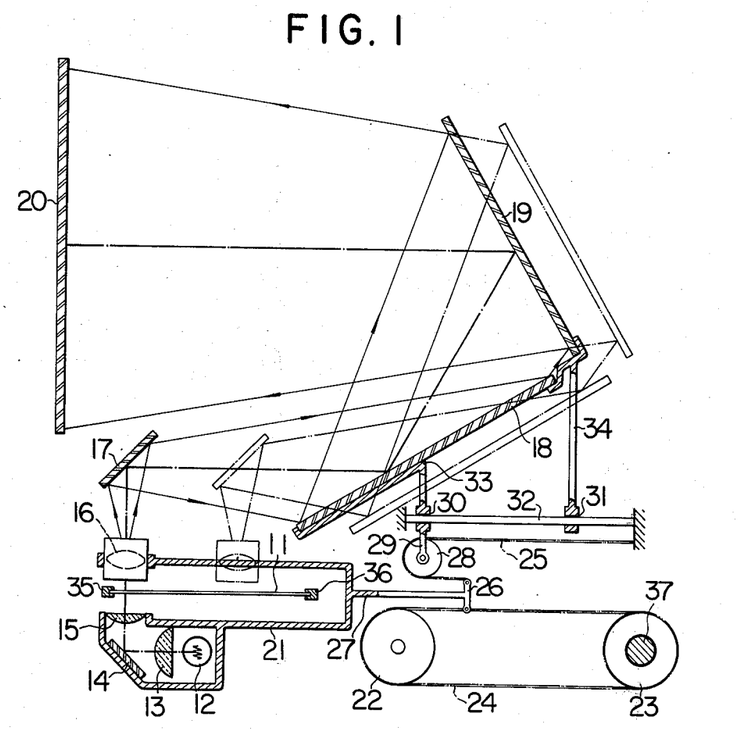
FIG. 1 and FIG. 2 are a sectional view and a schematic perspective view of a microfiche projection device incorporating the present invention.

FIG. 1 shows a device for selecting a frame of a microfiche 11 and projecting such frame. The device comprises an X-direction control system for controlling the position of a projection system on the X-axis, and a Y-direction control system for controlling the position of the microfiche 11 on the Y-axis. A frame of the microfiche 11 to be projected is selected by the X-direction control system and Y-direction control system, and the frame is illuminated by light emanating from a lamp 12 and passed through a condenser lens 13, a reflector 14 and another condenser lens 15. The light transmitted through the frame is thrown on to a screen 20 through a projection lens 16 and reflectors 17 to 19, so that an image of the frame can be formed in the screen 20.

Assuming that frames are arranged on the microfiche 11 in $m$ rows in the X-direction and $n$ columns in the Y-direction, the projection system 12 to 20 can be moved into any one of *m* positions on the X-axis in which it can project a frame of one of the rows on the microfiche 11, and the microfiche 11 can be moved into any one of *n* positions on the Y-axis in which a frame of one of the columns on the microfiche 11 can be projected by the projection system 12 to 20.

The lamp 12, condenser lens 13, reflector 14, condenser lens 15, projection lens 16 and reflector 17 of the projection system are supported as a unit by a frame 21. Trained over a pair of rollers 22 and 23 is a wire 24 which is connected at a predetermined portion thereof to a free end of another wire 25 by a connector 26. The frame 21 is connected by a connector 27 to the connector 26. The wire 25 which is fixed at the other end thereof is trained over a roller 28 which is connected by a connector 29 to a bearing 30 which is movably mounted, together with another bearing 31, on a fixed shaft 32.

The fixed shaft 32 is disposed parallel to the X-axis, and the wire 24 is also disposed parallel to the X-axis, so that the connector 26 moves on the X-axis. The roller 28 is urged to move leftwardly in FIG. 1 by the biasing force of a spring (not shown). The reflectors 18 and 19 are supported as a unit by supporters 33 and 34 which are fixed to the bearings 30 and 31 respectively.

On the other hand, the microfiche 11 disposed parallel to a plane including both the X-axis and Y-axis is supported by guides 35 and 36 for movement on the Y-axis.

Figures 2, 4:
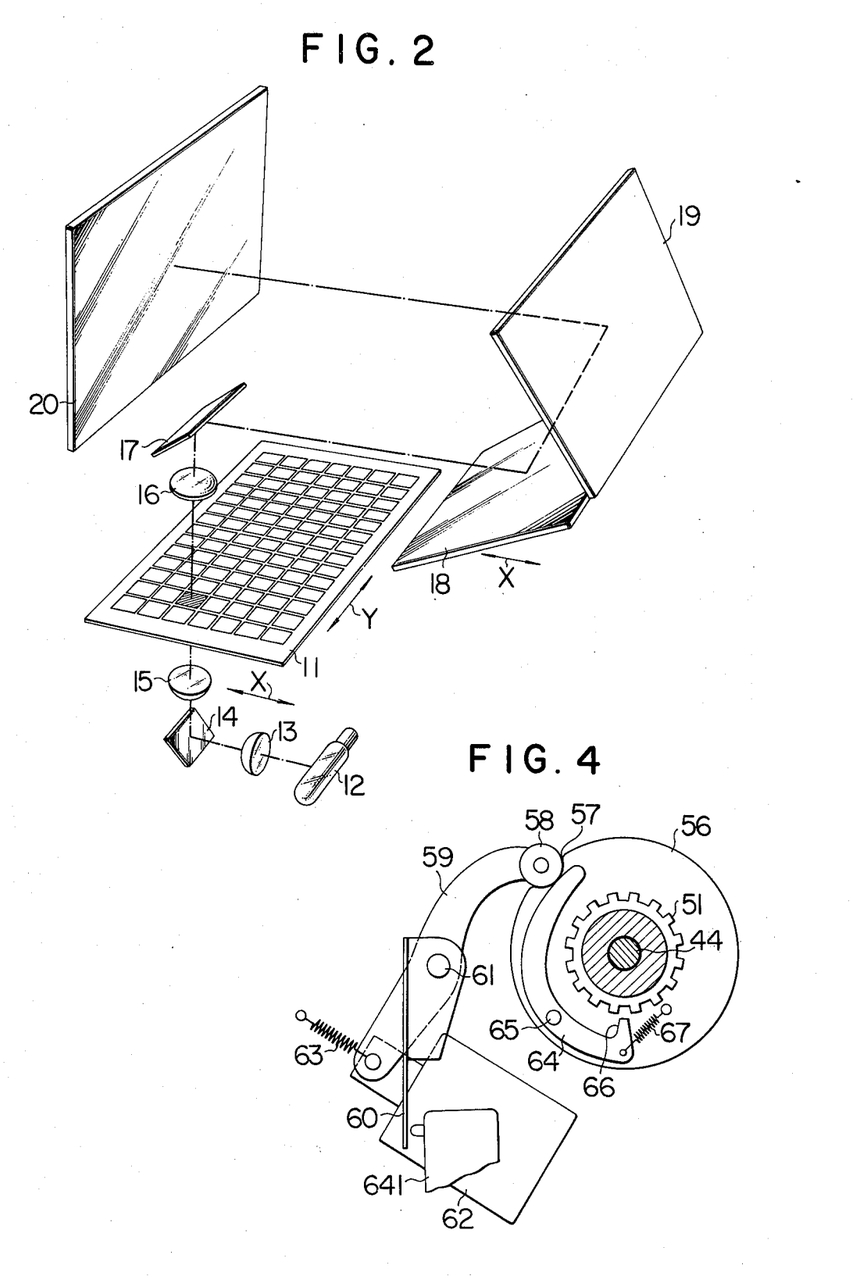
FIG. 4 is a sectional view taken along the line IV–IV of FIG. 3.
Figure 3:
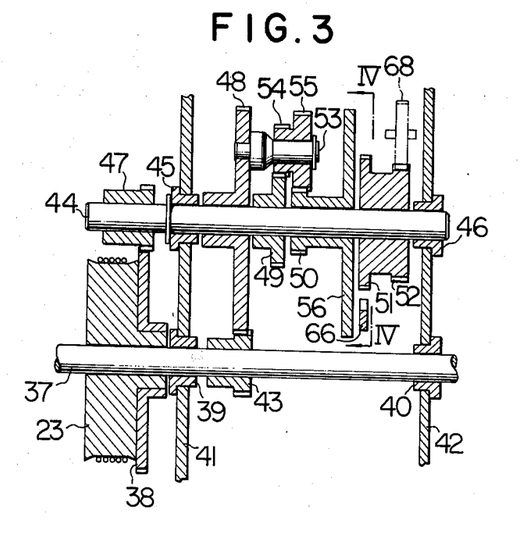
FIG. 3 is a fragmentary sectional view of the microfiche projection device shown in FIG. 1 and FIG. 2.

The X-direction control system will now be described. The roller 23 is loosely supported by a shaft 37 and has fixed thereto a gear 38 as shown in FIG. 3 and FIG. 4. The shaft 37 is rotatably journalled by bearings 39 and 40 secured to side plates 41 and 42 respectively and has a gear 43 fixed thereto.

The side plates 41 and 42 also have secured thereto bearings 45 and 46 which rotatably support a shaft 44 disposed parallel to the shaft 37. Mounted on the shaft 44 from left to right in FIG. 3 on the shaft 44 are gears 47 to 52 which are disposed in the indicated order, the gears 47 and 49 being fixed to the shaft while the gears 48 and 50 to 52 are rotatably supported by the shaft 44. Gears 38 and 47 are in meshing engagement with each other while gears 43 and 48 are in meshing engagement with each other.

A shaft 53 is planted on one side of gear 48 for loosely supporting gears 54 and 55 thereon; although gears 54 and 55 are formed integrally, they have different diameters and are maintained in meshing engagement with gears 49 and 50 respectively.

Formed integrally with gear 50 is a cam 56 which is formed with a minor diameter portion 57 as shown in FIG. 4. Positioned against the periphery of the cam 56 is a roller 58 which is rotatably supported by one end of a lever 59 which is pivotally supported by a shaft 61. A lever 60 which is formed integrally with lever 59 is also pivotally supported by shaft 61. Lever 59 is mounted at the other end thereof on a movable shaft of solenoid 62 and connected to one end of a spring 63 which is connected to an immovable member (not shown) at the other end thereof. Thus lever 59 is urged to move clockwise in FIG. 4 by the biasing force of spring 63.

A movable member of a motor switch 641 is disposed near a front end portion of lever 60. A locking lever 64 is pivotally connected through a pin 65 to one side of the cam 56 and has one end portion which is adapted to be brought into engagement with the roller 58. The locking lever 64 is formed in hook shape at the other end portion 66 thereof for engagement with gear 51. A spring 67 is mounted between the end portion 66 of locking member 64 and one side of cam 56, so that the lever 64 is urged to move counter clockwise in FIG. 4 by the biasing force of spring 67 which is lower in resilience than spring 63.

Figure 9:
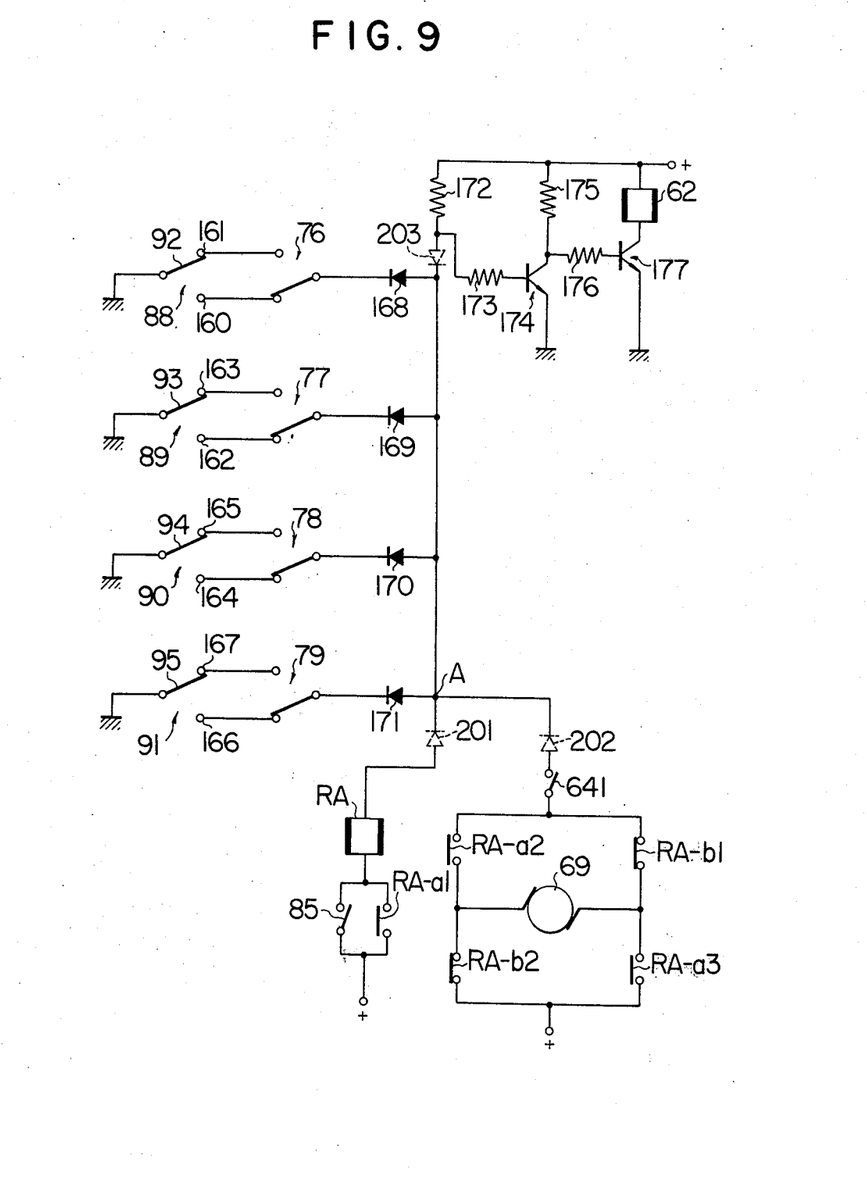
FIG. 9 is a diagram showing one example of the circuit used in the invention.

Gear 52 is connected through a gear 68 to a direct current motor 69 (See FIG. 9). Shaft 37 has attached to one end thereof a fine position adjusting knob and is exposed to a friction force exerted thereon by brake means.

Figure 5:
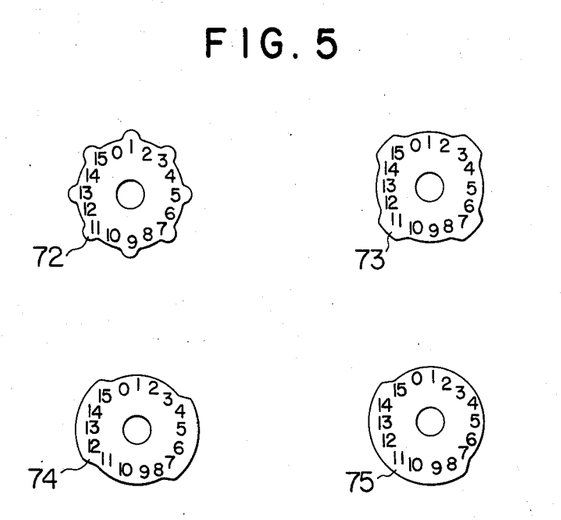
FIG. 5 is a plan view of the cams used in the invention.
Figure 6:
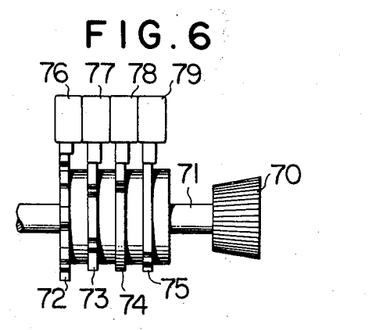
FIG. 6 is a side view of the switch means used in the invention.

A selection button 70 for selecting the position of the projection system is connected, as shown in FIG. 6, to a shaft 71 having cams 72 to 75 fixed thereto as shown in FIG. 5. Cams 72 to 75 have the weight of 1, 2, 4 and 8 respectively and each correspond to one of the digit positions in the binary notation system. If the projection system is to be positioned in one of 16 positions, for example, the shaft 71 is rotated through an angle corresponding to 16 angles of rotation which corresponds to the position selected for the projection system. Selection switches 76 to 79 are provided such that they correspond to cams 72 to 75 respectively.

It will be seen that cam 72 actuates selection switch 76 when shaft 71 has moved through the first, third, fifth, seventh, ninth, eleventh, thirteenth or fifteenth angle of rotation, that cam 73 actuates selection switch 77 when shaft 71 has moved through the second, third, sixth, seventh, tenth, eleventh, fourteenth or fifteenth angle of rotation, that cam 74 actuates selection switch 78 when shaft 71 has moved through the fourth, fifth, sixth, seventh, twelfth, thirteenth, fourteenth or fifteenth angle of rotation, and that cam 75 actuates selection switch 79 when shaft 71 has moved through the eighth, ninth, tenth, eleventh, twelfth, thirteenth, fourteenth or fifteenth angle of rotation. Thus the selection switches 76 to 79 perform a binary operation according to the position selected for the projection system by means of the selection button 70.

Figure 7:
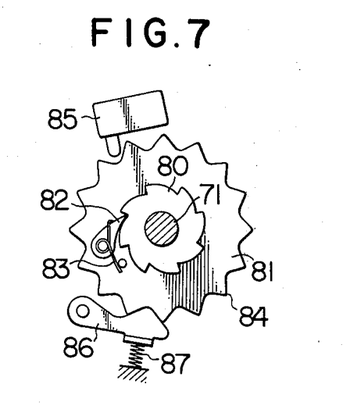
FIG. 7 is a side view of one example of the movement direction used in the invention.

A ratchet wheel 80 is fixed to shaft 71 as shown in FIG. 7. A switch actuating member 81 is loosely mounted on shaft 71. A pawl 82 is pivotally connected to one side of the switch actuator 81, and a spring 83 is mounted between the pawl 82 and switch actuating member 81, so that the pawl 82 is maintained in pressing engagement with ratchet wheel 80. The switch actuating member 81 is formed at its periphery with a plurality of projections 84 which have a pitch smaller than the angle through which the selection button 70 is turned to move the projection system from a position in which it is disposed to the adjacent position.

A switch 85 and the switch actuating member 81 are disposed in spaced juxtaposed relationship. A pivotally supported stopper 86 is urged by the biasing force of a spring 87 into pressing engagement with the periphery of the switch actuating member 81, so that a free end of the stopper 86 is maintained in engagement with a valley formed by the two adjacent projections 84.

When shaft 71 is turned clockwise in FIG. 7, the ratchet wheel 80 rotates but the switch actuating member 81 is prevented from rotating, so that the switch 85 is not actuated. When shaft 71 is turned counter clockwise, however, the pawl 82 is brought into engagement with the ratchet wheel 80, and the ratchet wheel 80 and switch actuating member 81 rotate intermittently, so that the switch 85 is intermittently actuated by the projections 84 of the member 81.

Figure 8:
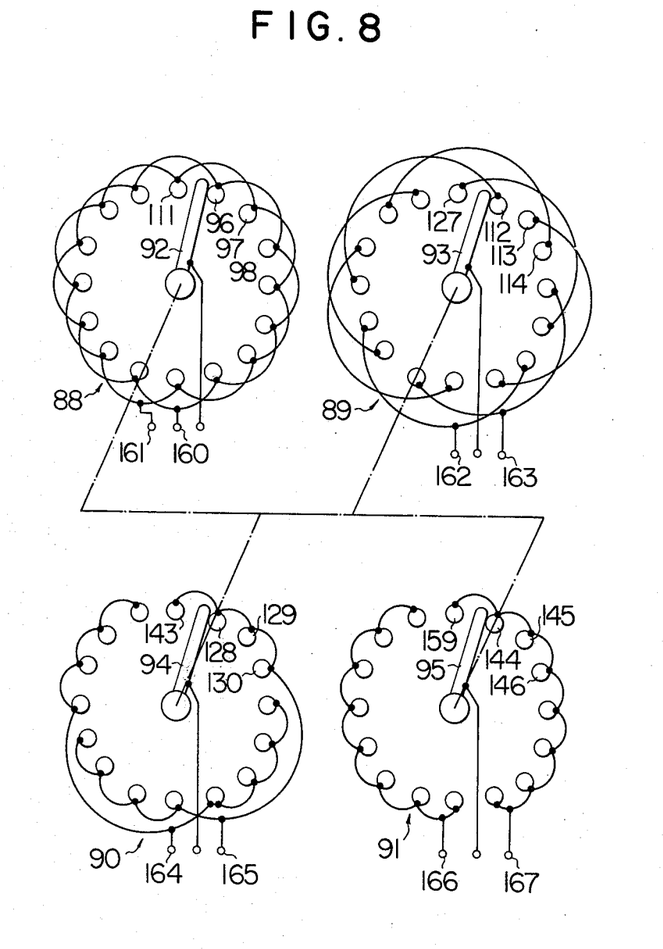
FIG. 8 is a wiring diagram of the rotary switches used in the invention.

Four rotary switches 88 to 91 shown in FIG. 8 have movable contacts 92 to 95, respectively, which are connected to the DC motor 69 through speed reducing means at, say, a reduction gear ratio of 1/16, so that the movable contacts move from one fixed contact to the next fixed contact as the motor 69 makes one revolution. The rotary switches 88 to 91 have a plurality of fixed contacts 96 to 111, 112 to 127, 128 to 143 and 144 to 159 respectively, and have a weight corresponding to 1, 2, 4 and 8 respectively, so that the rotary switches perform a binary operation according to the position in which the projection system is disposed.

More specifically, the first, third, fifth . . . . and fifteenth fixed contacts 96, 98, 100, 102, 104, 106, 108 and 110 of rotary switch 88 are connected to a normally open terminal 160 while the zeroth, second, fourth . . . . and fourteenth fixed contacts 111, 97, 99 . . . and 109 thereof are connected to a normally closed terminal 161. The second, third, sixth, seventh, tenth, eleventh, fourteenth and fifteenth fixed contacts 113, 114, 117, 118, 121, 122, 125 and 126 of rotary switch 89 are connected to a normally open terminal 162 while the zeroth, first, fourth, fifth, eighth, ninth, twelfth and thirteenth fixed contacts 127, 112, 115, 116, 117, 120, 123 and 124 thereof are connected to a normally closed terminal 163. The fourth to seventh and twelfth to fifteenth fixed contacts 131 to 134 and 139 to 142 of rotary switch 90 are connected to a normally open terminal 164 while the zeroth to third and eighth to eleventh fixed contacts 143, 128 to 130, and 135 to 138 thereof are connected to a normally closed terminal 165. The eighth to fifteenth fixed contacts 151 to 158 of rotary switch 91 are connected to a normally open terminal 166 while the zeroth to seventh fixed contacts thereof are connected to a normally closed terminal 167.

As shown in FIG. 9, the movable contacts 92 to 95 of rotary switches 88 to 91 respectively are grounded, and the normally open terminals 160, 162, 164 and 166 are connected to normally closed terminals of the selection switches 76 to 79 for the corresponding digit positions of the binary number. Movable contacts of the selection switches 76 to 79 are connected to cathodes of diodes 168 to 171 whose anodes are connected in common to a point A and connected through a resistor 172 to a positive DC power source and through a resistor 173 to the base of a transistor 174 of the NPN type.

Transistor 174 has an emitter which is grounded and a collector which is connected, through a resistor 175, to the positive DC power source and, through a resistor 176, to the base of a transistor 177 of the NPN type. Transistor 177 has an emitter which is grounded and a collector which is connected, through the solenoid 62, to the positive DC power source.

The point A is connected in series to a positive DC power source through a relay RA and a shunt circuit of a normally open contact RA-$a^1$ of relay RA and a switch 85. The point A is also connected in series to a DC power source through the motor switch 641, a normally open contact RA-$a^2$ of relay RA, DC motor 69, and a normally open contact RA-$a^3$ of relay RA, and also through a normally closed contact RA-$b^1$, DC motor 69 and a normally closed contact RA-$b^2$ of relay RA to the DC power source.

Diodes 201 to 203 for precluding reverse current flow may be mounted when the voltages supplied by the DC power source vary in value from one another. The solenoid 62 may be connected directly between the point A and the DC power source. The motor switch 641 may be done without if the rise time of solenoid 62 is not so great as that of relay RA.

In the X-direction control system constructed as aforesaid, the rotary switches 88 to 91 perform a binary operation according to the position in which the projection system is disposed. At the same time, the switches 76 to 79 perform a binary operation according to the position of the projection system selected by means of the selection button 70. Accordingly, when the position in which the projection system is disposed coincides with position selected for the projection system, the rotary switches 88 to 91 and the selection switches 76 to 79 are in the same state of operation, so that the point A has a high potential. This renders the DC motor 69 inoperative and turns on transistor 174 and turns off transistor 177, so that the solenoid 62 remains de-energized.

Let us assume that the projection system is now disposed in a third position and the rotary switches 88 and 89 and the selection switches 76 and 77 are operative. If the selection button 70 is turned in the normal direction and select a fifth position for the projection system, then the selection switches 76 and 78 are actuated, and consequently the rotary switches 88 to 91 differ from the selection switches 76 to 79 in the state of operation. Thus the point A is grounded and transistor 177 is turned on and transistor 174 is turned off, thereby energizing the solenoid 62. As a result the motor switch 641 is closed and the roller 58 shown in FIG. 4 is released from engagement with the cam 56 and locking lever 64. This permits the locking lever 64 to be urged by the biasing force of spring 67 into engagement with the gear 51.

If the selection button 70 is turned in the normal direction, then the shaft 71 rotates clockwise, but the switch 85 and relay RA are not actuated. Since the point A has a low potential, a normal direction current is supplied to the DC motor 69 through the motor switch 641 and the normally closed contacts RA-$b^1$ and RA-$b^2$ of relay RA, so that motor 69 begins to rotate in the normal direction. Rotation of the DC motor 69 causes the shaft 44 to rotate through the gears 68, 51, cam 56 and gears 50, 55, 54, 49, and causes the roller 23 to rotate through gears 47, 38. This moves the wire 24. Thus the lamp 12, condenser lens 13, reflector 14, condenser lens 15 projection lens 16 and reflector 17 moves in the normal direction on the X-axis while the reflectors 18, 19 move in the direction on the X-axis at a rate which is one-half that of the elements 12 to 17.

The projection system moves from the third position in the normal direction is this way, and the state of operation of rotary switches 88 to 91 varies depending on the position in which the projection system is actually disposed. Upon the projection system reaching the fifth position selected for it, the rotary switches 88 to 91 become similar to the selection switches 76 to 79 in the state of operation and the point A has a high potential. This de-energizes the solenoid 62 and opens the motor switch 641. At the same time, the roller 58 is brought into pressing engagement with the cam 56 and the supply of current to the DC motor 69 is cut off. The roller 58 is brought into engagement with the minor diameter portion 57 of the cam 56 and the locking lever 64 is pushed by the roller 58, so that the lever 64 is released from engagement with the gear 51 and the projection system remains stationary in the fifth position. In case the projection system does not stop correctly in the fifth position, the roller 23 can be rotated through the gears 43, 48, 54, shaft 44 and gears 47 and 38 by rotating the shaft 37, so that the projection system can be moved. Thus the projection system can be correctly positioned in the fifth position.

Let us assume again that the projection system is in a third position and the rotary switches 88 and 89 and selection switches 76 and 78 are operative. If the selection button 70 is turned in the reverse direction, and select a first position for the projection system, then the selection switch 76 is actuated, and consequently the rotary switches 88 to 91 differ from the selection switches 76 to 79 in the state of operation. This energizes the solenoid 62 and closes the motor switch 641 and, at the same time, the locking lever 64 is brought into engagement with the gear 51.

If the selection switch 70 is turned in the reverse direction, then the shaft 71 rotates counter clockwise the switch 85 is actuated intermittently. Since the point A has a low potential, the relay RA is actuated and its normally open contact RA-$a^1$ is closed, so that the relay RA is self held. At the same time, the normally closed contacts RA-$b^1$, RA-$b^2$ are opened and the normally open contacts RA-$a^2$ and RA-$a^3$ are closed. Thus a reverse direction current is supplied to the DC motor 69 which rotates in the reverse direction to move the projection system in the reverse direction on the X-axis.

The projection system moves from the third position in the reverse direction in this way, and the state of operation of the rotary switches 88 to 91 varies depending on the position in which the projection system is disposed. Upon the projection system reaching the first position selected for it, the rotary switches 88 to 91 become similar to the selection switches 76 to 79 in the state of operation. The solenoid 62 is de-energized and the locking lever 64 is released from engagement with the gear 51, so that the projection system stops in the first position. The motor switch 641 is opened and the DC motor 69 is de-actuated; since the point A has a high potential, the relay A is de-actuated.

It will be appreciated that the projection system can be moved to any position as desired on the X-axis by manipulating the selection button, so as to thereby select the row on the microfiche 11 in which the frame to be projected is disposed.

Figure 13:
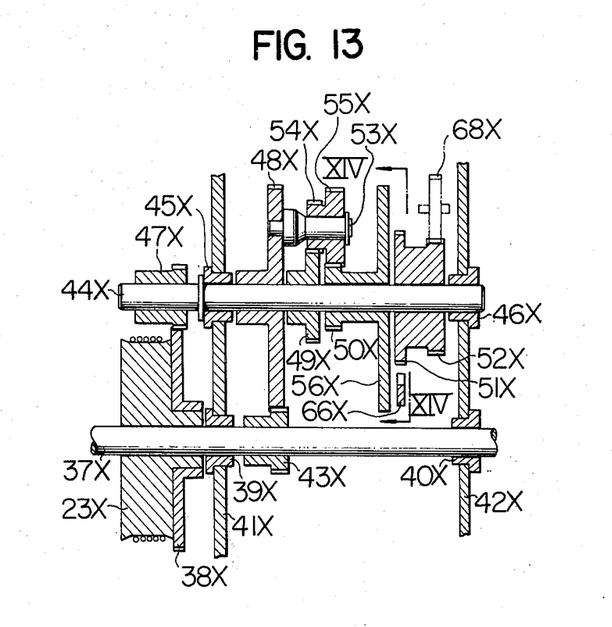
Figure 14:
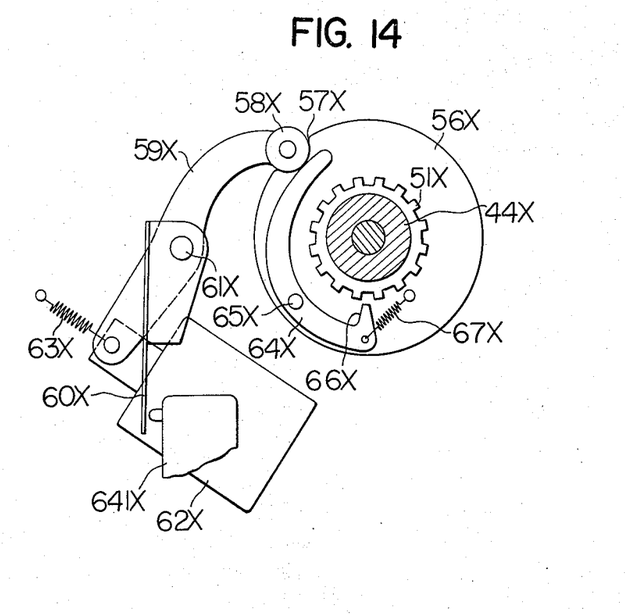
FIG. 14 is a sectional view taken along the line XIV–XIV of FIG. 13.

The Y-direction control system is constructed in the same manner as the X-direction control system. More specifically, the microfiche 11 is detachably gripped by one end of a connector 27 which is fixed at the other end to a predetermined portion of a wire 24 trained over a pair of rollers 22x and 23x. The roller 23x is loosely mounted on a shaft 37x and has a gear 38x secured to the roller 23x as shown in FIG. 13 and FIG. 14.

The shaft 37x which is rotatably journalled by bearings 39x and 40x secured to side plates 41x and 42x respectively is disposed parallel to a gear 44x on which gears 47x to 52x are mounted successively. The gears 47x and 49x are fixed to the shaft 44x while the gears 48x and 50x to 52x are loosely mounted on the shaft 44x. Gears 38x and 47x are in meshing engagement with each other while gears 43x and 48x are in meshing engagement with each other.

A shaft 53x is planted on one side of gear 48x for loosely supporting gears 54x and 55x thereon. Although gears 54x and 55x are formed integrally, they have different diameters and are maintained in meshing engagement with gears 49x and 50x respectively.

Formed integrally with gear 50x is a cam 56x which is formed with a minor diameter portion 57x. Positioned against the periphery of the cam 56x is a roller 58x which is rotatably supported by one end of a lever 59x which is pivotally supported by a shaft 61x. A lever 60x which is formed integrally with lever 59x is also pivotally supported by shaft 61x. Lever 59x is mounted at the other end thereof on a movable shaft of solenoid 62x and connected to one end of a spring 63x which is connected to an immovable member (not shown) at the other end thereof. Thus lever 59 is urged to move clockwise by the biasing force of spring 63x.

A movable member of a motor switch 641x is disposed near a front end portion of lever 60x. A locking lever 64x is pivotally connected through a pin 65x to one side of the cam 56x and has one end portion which is adapted to be brought into engagement with the roller 58x. The locking lever 64x is formed in hook shape at the other end portion 66x thereof for engagement with gear 51x. A spring 67x is mounted between the other end portion of locking member 64x and one side of cam 56x, so that lever 64x is urged to move counter clockwise by the biasing force of spring 67x which is lower in resilience than spring 63x.

Figure 19:
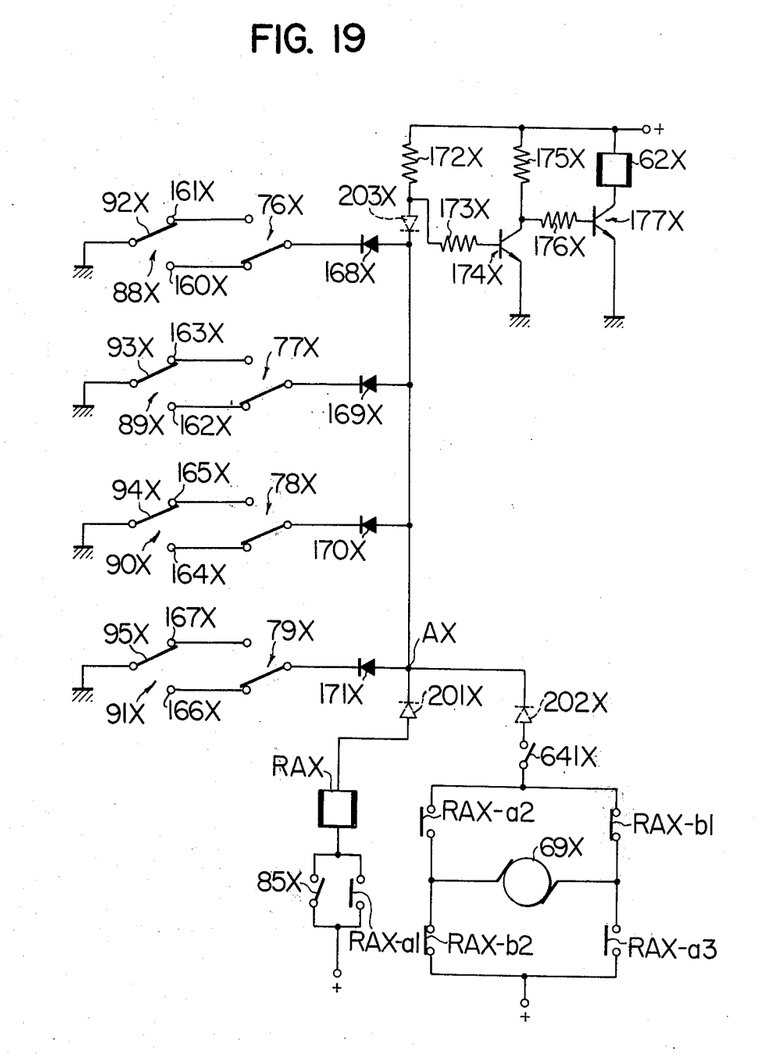
FIG. 19 is a diagram showing the circuit used in the invention.

Gear 52x is connected through a gear 68x to a direct current motor 69x (See FIG. 19). Shaft 37x has attached to one end thereof a fine position adjusting knob and is exposed to a friction force exerted thereon by brake means.

Figure 15:
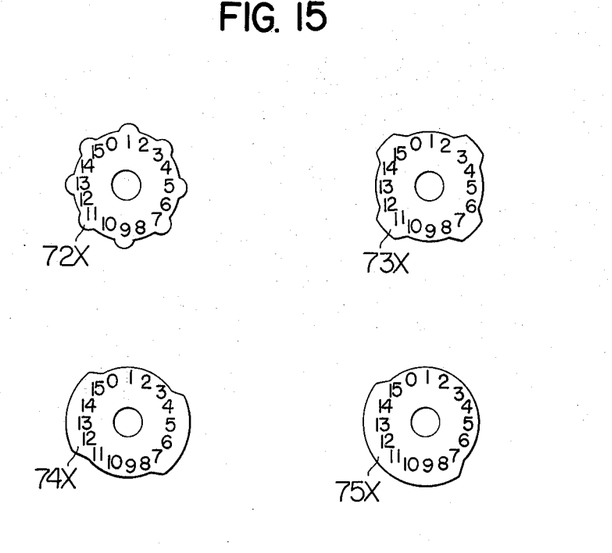
FIG. 15 is a plan view of the cams used in the invention.
Figure 16:
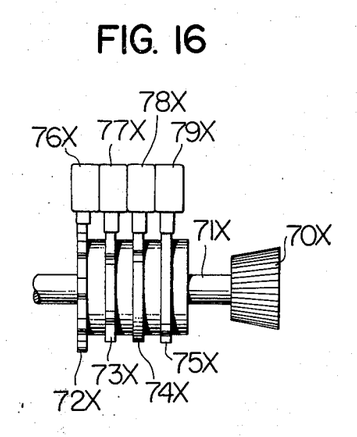
FIG. 16 is a side view of the switch means used in the invention.

A selection button 70x for selecting the position of the projection system is connected, as shown in FIG. 16, to a shaft 71x having cams 72x to 75x fixed thereto as shown in FIG. 15. Cams 72x to 75x have the weight of 1, 2, 4 and 8 respectively and each correspond to one of the digit positions in the binary notation system. If the projection system is to be positioned in one of 16 positions, for example, the shaft 71x is rotated through an angle corresponding to cams 72x to 75x respectively. Selection switches 76x to 79x are provided such that they correspond to cams 72x to 75x respectively.

It will be seen that cam 72x actuates selection switch 76x when shaft 71x has moved through the first, fifth, seventh, ninth, eleventh, thirteenth or fifteenth angle of rotation, that cam 73x actuates selection switch 77x when shaft 71x has moved through the second, third, sixth, seventh, tenth, eleventh, fourteenth or fifteenth angle of rotation, that cam 74x actuates selection switch 78x when shaft 71x has moved through the fourth, fifth, sixth, seventh, twelfth, thirteenth, fourteenth or fifteenth angle of rotation, and that cam 75x actuates selection switch 79x when shaft 71x has moved through the eighth, ninth, tenth, eleventh, twelfth, thirteenth, fourteenth or fifteenth angle of rotation. Thus selection switches 76x to 79x perform a binary operation according to the position selected for the projection system by means of the selection button 70x.

Figure 17:
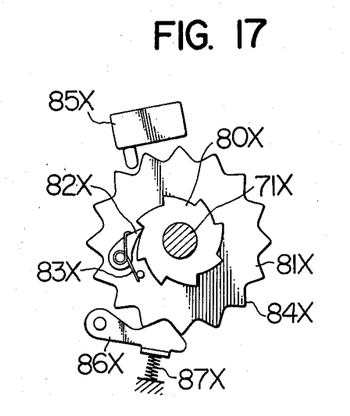
FIG. 17 is a side view of the movement direction detection means used in the invention.

A ratchet wheel 80x is fixed to shaft 71x as shown in FIG. 17. An actuating member 81x is loosely mounted on shaft 71x. A pawl 82x is pivotally connected to one side of the switch actuator 81x, and a spring 83x is mounted between the pawl 82x and switch actuating member 81x, so that the pawl 82x maintained in pressing engagement with ratchet wheel 80x. The switch actuating member 81x is formed at its periphery with a plurality of projections 84x which have a pitch smaller than the angle through which the selection button 70x is turned to move the projection system from a position in which it is disposed to the adjacent position.

A switch 85x and the switch actuating member 81x are disposed in spaced juxtaposed relationship. A pivotally supported stopper 86x is urged by the biasing force of a spring 87x into pressing engagement with the periphery of the switch actuating member 81x, so that a free end of the stopper 86x is maintained in engagement with a valley formed by the two adjacent projections 84x.

When shaft 71x is turned clockwise, the ratchet wheel 80x rotates but the switch actuating member 81x is prevented from rotating, so that the switch 85x is not actuated. When shaft 71x is turned counter clockwise, however, the pawl 82x is brought into engagement with the ratchet wheel 80x, and the ratchet wheel 80x and switch actuating member 81x rotate intermittently, so that the switch 85x us intermittently actuated by the projections 84x of the member 81x.

Figure 18:
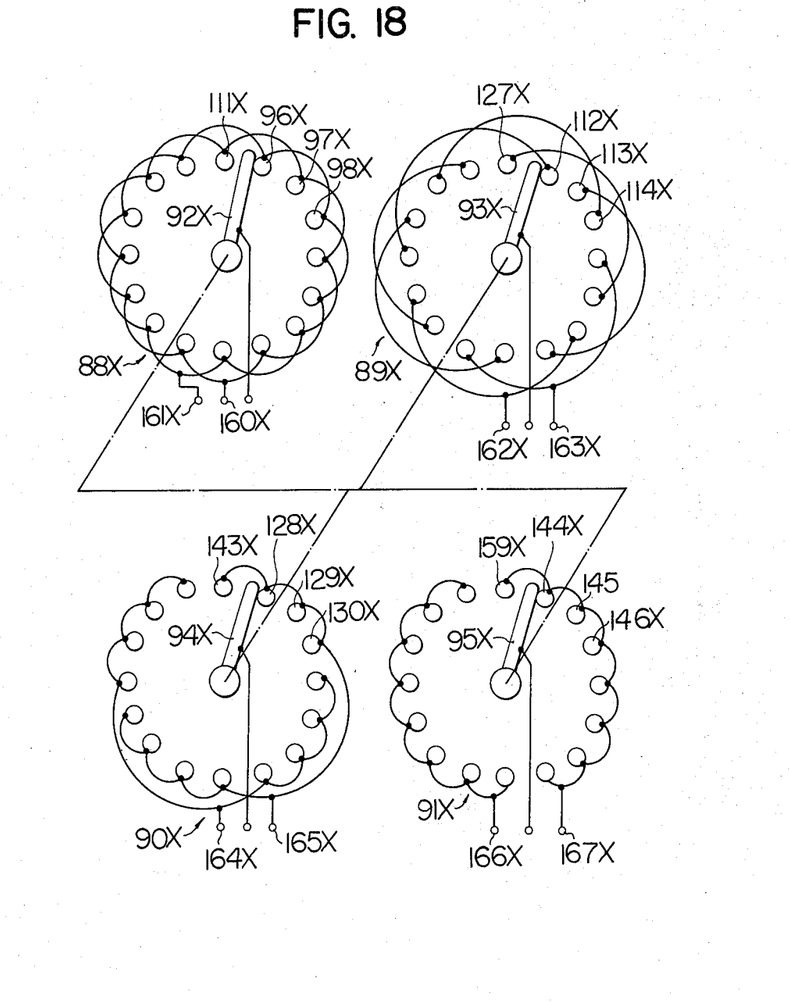
FIG. 18 is a wiring diagram of the rotary switches used in the invention.

Four rotary switches 88x to 91x shown in FIG. 18 have movable contacts 92x to 95x, respectively, which are connected to the DC motor 69x through speed reducing means at, say, a reduction gear ratio of 1/16, so that the movable contacts move from one fixed contact to the next fixed contact as the motor 69x makes one revolution. The rotary switches 88x to 91x have a plurality of fixed contacts 96x to 111x, 112x to 127x, 128x to 143x and 144x to 159x respectively, and have a weight corresponding to 1, 2, 4 and 8 respectively, so that the rotary switches perform a binary operation according to the position in which the projection system is disposed.

More specifically, the first, third, fifth . . . . . . and fifteenth fixed contacts 96x, 98x, 100x, 102x, 104x, 106x, 108x and 110x of rotary switch 88x are connected to a normally open terminal 160x while the zeroth, second, fourth . . . . and fourteenth fixed contacts 111x, 97x, 99x . . . . and 109x thereof are connected to a normally closed terminal 161x. The second, third, sixth, seventh, tenth, 118x, 121x, 122x, 125x and 126x eleventh, fourteenth and fifteenth fixed contacts 113x, 114x, 117x, of rotary switch 89x are connected to a normally open terminal 162x while the zeroth, first, fourth, fifth, eighth, ninth, twelfth and thirteenth fixed contacts 127x, 112x, 115x, 117x, 120x, 123x and 124x thereof are connected to a normally closed terminal 163x. The fourth to seventh and twelfth to fifteenth fixed contacts 131x to 134x and 139x to 142x of rotary switch 90x are connected to a normally open terminal 164x while the zeroth to third and eighth to eleventh fixed contacts 143x, 128x to 130x, and 135x to 138x thereof are connected to a normally closed terminal 165x. The eighth to fifteenth fixed contacts 151x to 158x of rotary switch 91x are connected to a normally open terminal 166x while the zeroth to seventh fixed contacts thereof are connected to a normally closed terminal 167x.

As shown in FIG. 19, the movable contacts 92x to 95x of rotary switches 88x to 91x respectively are grounded, and the normally open terminals 160x, 162x, 164x and 166x are connected to normally closed terminals of the selection switches 76x to 79x for the corresponding digit positions of the binary number. Movable contacts of the selection switches 76x to 79x are connected to cathodes of diodes 168x to 171x whose anodes are connected in common to a point Ax and connected through a resistor 172x to a positive DC power source and through a resistor 173x to the base of a transistor 174x of the NPN type.

Transistor 174x has an emitter which is grounded and a collector which is connected, through a resistor 175x, to the positive DC power source and, through a resistor 176x, to the base of a transistor 177x of the NPN type. Transistor 177x has an emitter which is grounded and a collector which is connected, through the solenoid 62x, to the positive DC power source.

The point Ax is connected in series to a positive DC power source through a relay RA and a shunt circuit of a normally open contact RAx-$a^1$ of relay RAx and a switch 85x. The point Ax is also connected in series to a DC power source through the motor switch 641x, and a normally open contact RAx-$a^2$ of relay RAx, DC motor 69x, and a normally contact RAx-$a^3$ of relay RAx, and also through a normally closed contact RAx-$b^1$, DC motor 69x and a normally closed contact RAx-$b^2$ of relay RAx to the DC power source.

Diodes 201x to 203x for precluding reverse current flow may be mounted when the voltages supplied by the DC power source vary in value from one another. The solenoid 62x may be connected directly between the point Ax and the DC power source. The motor switch 641x may be done without if the rise time of solenoid 62x is not so great as that of relay RAx. The Y-direction control system constructed as aforesaid function in the same manner as the X-direction control system.

Figure 10:
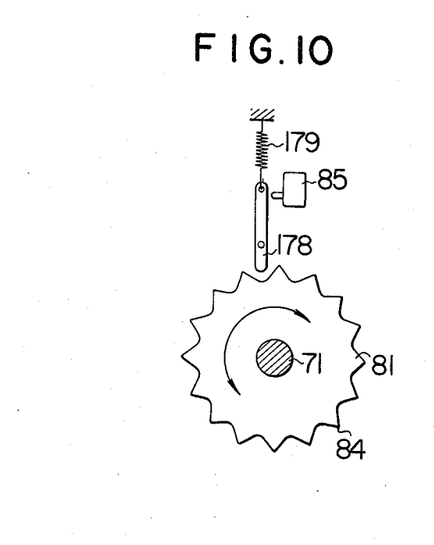
FIG. 10 is a side view of another example of the movement direction detection means used in the invention.

The movement direction means shown in FIG. 7 detects the direction of rotation of the shaft 71 and actuates the relay RA. It is to be understood that the invention is not limited to specific form of the means shown. Another means, such as the one shown in FIG. 10, may be used. As shown, the switch actuator 81 is secured to the shaft, and a lever 178 is pivotally supported and urged by the biasing force of a spring 179 to move radially of the shaft 71, so that one end of the lever 178 is intermittently moved to right or left by one of the projections 84 depending on the direction of rotation of switch actuator 81. This causes the switch 85 disposed on one side of the lever 178 to be intermittently actuated by the lever 178 as the shaft 71 rotates in a predetermined direction.

Figure 11:
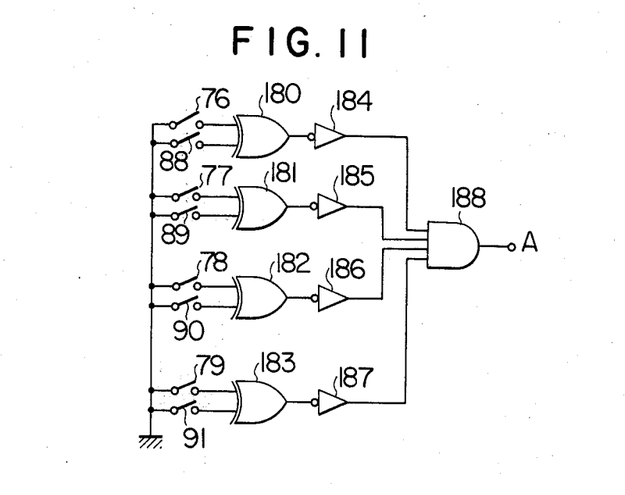
FIG. 11 is a diagram showing another example of a part of the circuit shown in FIG. 9.
Figure 12:
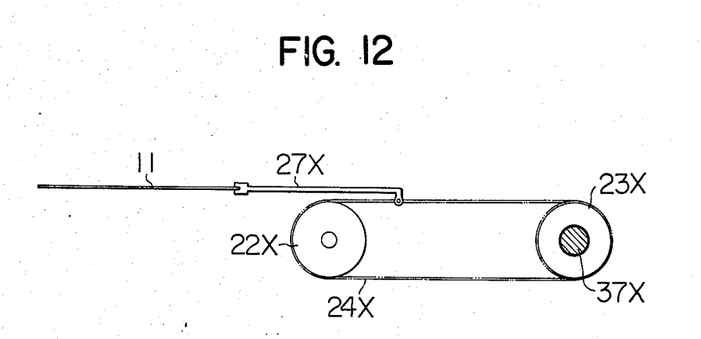
FIG. 12 and FIG. 13 are fragmentary sectional views of the microfiche projection device shown in FIG. 1 and FIG. 2.

The circuit using the switches 76 to 79 and 88 to 91 and the diodes 168 to 171 shown in FIG. 9 may be replaced by a circuit as shown in FIG. 11. As shown, the switches 76 to 79 are connected between one input terminal of exclusive OR circuits 180 to 183 respectively and the ground while the switches 88 to 91 are connected between the other input terminal of the exclusive OR circuits 180 to 183 and the ground. Output terminals of the exclusive OR circuits 180 to 183 are connected through NOT circuits 184 to 187 to input terminals of AND circuit 188, so that an output terminal of the AND circuit 188 is the point A.

When the switches 76 to 79 and switches 88 to 91 all coincide with one another in the state of operation, the outputs of the exclusive OR circuits 180 to 183 all have a low potential and the outputs of the NOT circuits 184 to 187 have a high potential, so that the out put of the AND circuit 188 has a high potential. When the switches 76 to 79 do not coincide with the switches of 88 to 91 in the state of operation, at least one of the outputs of the exclusive OR circuits 180 to 183 has a high potential and consequently the output of the AND circuit 188 has a low potential.

The invention has been shown and described above as being used for the projection of a frame of a microfiche. The invention also can have application in producing a duplicate of or photographing each frame of a microfiche. The invention can be used in effecting position control of other movable members than a microfiche. The invention can also be used in cases where position control of a movable member is effected either on a single axis or on more than three axes. The switch means shown in FIG. 6 can be constructed as shown in FIG. 8. The switch means shown in FIG. 8 can be constructed as shown in FIG. 6.

What is claimed is:
1. A position control device including
 a. a first shaft;
 b. a movable body carried by and slidable along the length of said first shaft, said first shaft defining a plurality of positions to which the movable body is moved slidably;
 c. a second, rotatable shaft;
 d. means interconnecting said movable body and said rotatable shaft such that said movable body is capable of moving to a selected one of said plurality of positions on said first shaft;
 e. a motor for rotatably driving said rotatable shaft;
 f. a detector for detecting a current position of the movable body and for producing a digital signal indicative of the position of the movable body;
 g. a selector, manually operated in accordance with a desired position of the movable body, for producing a digital signal indicative of the desired position; and
 h. circuit means for comparing the digital signals from the selector and the detector to provide a comparison output, said circuit means including a solenoid energized in accordance with the comparison output and a switch controlled by said solenoid, said circuit means being operable to control the operation of the motor through said switch;
wherein the improvement comprises:
 i. a positioning device comprising
   i. a first lever driven by the solenoid and having a free end;
   ii. a roller pivotally mounted at the free end of the first lever;
   iii. a cam connected with the rotatable shaft and contacting the roller when the first lever is driven to a contacting position by the solenoid when the motor is turned off by the solenoid, the cam having a recess into which the roller drops and is locked to position the cam when the recess is positioned in rotational alignment with the roller;
   iv. a second lever journalled in the cam and adapted to be driven by the roller when the roller drops into the cam recess; and
   v. a gear, coupled with the drive shaft of the motor, engaged in rotational alignment with the cam by the second lever to permit shaft rotation when the second lever is not driven by the roller, and disengaged from the cam to stop shaft rotation when the second lever is driven by the roller.

* * * * *